United States Patent
Joffe

(10) Patent No.: US 8,971,717 B1
(45) Date of Patent: Mar. 3, 2015

(54) OPTICAL COMMUNICATION SYSTEMS AND METHODS WITH CROSSTALK CANCELLATION

(75) Inventor: Daniel M. Joffe, Owens Crossroads, AL (US)

(73) Assignee: ADTRAN, Inc., Huntsville, AL (US)

(*) Notice: Subject to any disclaimer, the term of this patent is extended or adjusted under 35 U.S.C. 154(b) by 594 days.

(21) Appl. No.: 13/367,205

(22) Filed: Feb. 6, 2012

(51) Int. Cl.
*H04B 10/00* (2013.01)
*H04B 10/04* (2006.01)
*H04B 10/12* (2006.01)

(52) U.S. Cl.
USPC ........... 398/136; 398/135; 398/137; 398/138; 398/139; 398/182; 398/192; 398/194; 398/195

(58) Field of Classification Search
CPC ........ H04B 10/40; H04B 10/43; H04B 10/50; H04B 15/00; H04B 17/00; H04B 17/009
See application file for complete search history.

(56) References Cited

U.S. PATENT DOCUMENTS

| | | | |
|---|---|---|---|
| 5,022,752 A | 6/1991 | Bu-Abbud |
| 5,825,516 A | 10/1998 | Walsh |
| 6,046,797 A | 4/2000 | Spencer et al. |
| 6,122,044 A | 9/2000 | Gautheron et al. |
| 6,344,778 B1 | 2/2002 | Nakamura et al. |
| 6,441,937 B1 | 8/2002 | Baur et al. |
| 7,126,678 B2 | 10/2006 | Fayolle et al. |
| 7,206,075 B2 | 4/2007 | Waagaard |
| 7,280,188 B2 | 10/2007 | Schmuck et al. |
| 7,317,874 B2 | 1/2008 | Li et al. |
| 7,440,701 B2 | 10/2008 | Li et al. |
| 7,450,848 B2 | 11/2008 | Li et al. |
| 7,469,025 B2 | 12/2008 | Tsatsanis et al. |
| 7,493,042 B2 | 2/2009 | Li et al. |
| 2005/0078963 A1 | 4/2005 | Lenosky |
| 2008/0025732 A1 | 1/2008 | Hattori |
| 2009/0257743 A1 | 10/2009 | Chung et al. |

FOREIGN PATENT DOCUMENTS

| | | |
|---|---|---|
| EP | 1748580 A1 | 7/2005 |
| EP | 1884758 A1 | 3/2006 |
| EP | 1675280 A1 * | 6/2006 |
| EP | 1901448 A1 | 9/2006 |
| EP | 1986350 A1 | 4/2007 |
| EP | 1524781 B1 | 10/2007 |

OTHER PUBLICATIONS

Sischka, et al., "Complimentary Correlation Optical Time-Domain Reflectometry—in respect to the HP 8145A Optical Time-Domain Reflectometer—technical," Hewlett-Packard Journal, Dec. 1988, p. 14-21.

(Continued)

*Primary Examiner* — Darren E Wolf
(74) *Attorney, Agent, or Firm* — Maynard Cooper & Gale, P.C.; Jon E. Holland

(57) ABSTRACT

An optical system has an optical emitter that transmits an optical signal through an optical fiber. An optical detector detects light from the fiber and provides an analog signal indicative of such light. A crosstalk cancellation element is configured to receive an electrical signal from the optical emitter and to adjust such signal in order to form a cancellation signal that models the optical and/or electrical crosstalk affecting the analog signal. The cancellation signal is subtracted from the analog signal thereby removing optical and/or electrical crosstalk from the analog signal.

12 Claims, 7 Drawing Sheets

(56) References Cited

OTHER PUBLICATIONS

Takushima, et al. "In-Service OTDR for Passive Optical Networks," OSA/OFC/NFOEC, 2010.

Turner, et al, U.S. Appl. No. 12/783,999 entitled, "Systems and Methods for Unobtrusively Testing Optical Fibers," filed May 20, 2010.

* cited by examiner

(12) United States Patent

OPTICAL COMMUNICATION SYSTEMS AND METHODS WITH CROSSTALK CANCELLATION

RELATED ART

Optical time domain reflectometers (OTDRs) for detecting optical fiber anomalies have been developed and successfully used. One type of OTDR transmits an M-sequence along an optical fiber. A portion of the light of the M-sequence is returned toward the transmitter from each point along the optical fiber. Such returns are produced by scattering of the light (Rayleigh backscatter) all along length of the fiber and in some cases by localized reflections (Fresnel reflections) at particular points along the fiber. At an anomaly, such as a degraded splice, more attenuation may occur as light passes through the splice, and in some cases more light may be reflected at this point than at other points that are free of anomalies. The OTDR measures the light returned from points along the length of the fiber and makes a display of those returns as a function of position. The display allows the user to detect anomalies in the fiber system.

The measured OTDR returns are quite small and are usually amplified by a high gain amplifier before being digitized by an analog-to-digital (A/D) converter. The relatively small amplitudes of the OTDR returns make these returns susceptible to being obscured by relatively small amounts of noise, including electrical and optical crosstalk.

Optical crosstalk generally occurs when light from the laser leaks into the OTDR receiver. One form of optical crosstalk includes reflections, referred to hereafter as "optical subassembly reflections," that are returned from an internal wall of the optical subassembly (OSA) without propagating through the optical fiber under analysis. Since the OSA reflections are not attenuated by the optical fiber, they usually have higher amplitudes than the fiber returns. Thus, the OSA reflections consume a significant portion of the dynamic range of the A/D converter even though such OSA reflections are of no interest to the OTDR. In general, it would be beneficial to cancel such optical crosstalk in order to preserve the dynamic range of the A/D converter for measurements of fiber reflections.

In addition to optical crosstalk, there is electrical crosstalk that also undesirably affects the OTDR measurements. In this regard, the optical emitter (e.g., laser diode) and the optical receiver (e.g., avalanche photodiode (APD)) within the OSA are coupled to electrical wiring that are in sufficiently close proximity such that electromagnetic energy couples between the wiring causing an additive signal (electrical crosstalk) that obscures the electrical signals output from the optical receiver. The electrical crosstalk in the OSA is relatively small compared to the normal data signals received by the OSA, but such crosstalk has a more significant effect on OTDR measurements, which are based on optical returns that are much smaller than typical data signals.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to optical communication systems and methods with crosstalk cancellation. In one exemplary embodiment, an optical communication system has an optical emitter that transmits an optical signal through an optical fiber. An optical detector detects optical signals (e.g., reflections) from the fiber and provides an analog signal indicative of such light, and the analog signal is used to detect anomalies along the fiber. A crosstalk cancellation element is configured to receive the analog signal and to cancel optical crosstalk (e.g., optical subassembly reflections) from the analog signal before it is input into an analog-to-digital (A/D) converter, thereby preserving the dynamic range of the A/D converter. Accordingly, more of the dynamic range is available for the fiber reflections. Unlike conventional filters for twisted-wire pairs where echoes all along the length of a twisted pair are canceled, a single tap is sufficient to cancel the OSA reflections since they typically occur only a few centimeters from the emitter. The cancellation signal is beneficially generated from the same current signal that drives the emitter. Doing so eliminates timing skew, enhancing the quality of the cancellation. Further, the path of such a cancellation signal may also include at least one filter that models electrical crosstalk induced by the driver circuitry for driving the emitter, thereby enabling the crosstalk cancellation signal to also cancel the electrical crosstalk.

Figure 1:
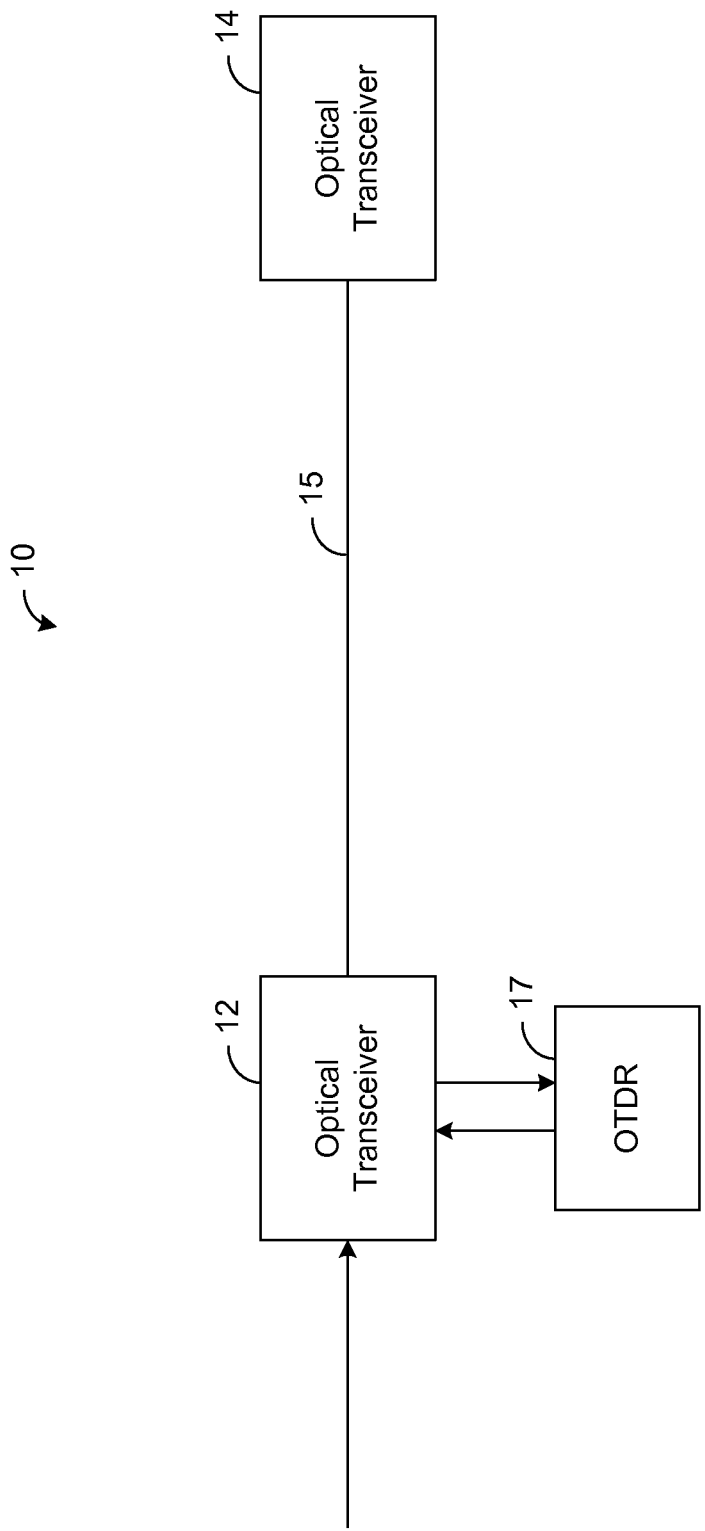
FIG. 1 is a block diagram illustrating an exemplary embodiment of a communication system in which an optical transceiver is coupled to an optical time domain reflectometer (OTDR) for detecting anomalies of an optical fiber that is coupled to the optical transceiver.

FIG. 1 depicts an exemplary embodiment of a fiber-optic communication system 10. The communication system 10 comprises an optical transceiver 12 coupled to a remote optical transceiver 14 via an optical fiber 15. The optical transceiver 12 is configured to transmit optical signals to the optical transceiver 14 via the fiber 15 and to receive optical signals (e.g., optical returns) from the fiber 15. The optical transceiver 12 is further configured to provide measurements of the received signals, as will be discussed in more detail hereafter. The system 10 also comprises an optical time domain reflectometer (OTDR) 17 coupled to the optical transceiver 12. The OTDR 17 is configured to receive measurements of optical returns from the fiber 15 and to detect anomalies, such as, for example, degraded splices, along the fiber 15 based on the returns.

In this regard, light generally reflects from points along the fiber 15 as the light propagates, but more light is typically reflected at a line anomaly, such as a degraded splice. In one exemplary embodiment, the OTDR 17 transmits a pseudo-random (PN) sequence, such as an M-sequence, through the fiber 15 and correlates the optical returns with the transmitted sequence in order to identify points along the fiber 15 that return more than nominal amounts of light. The OTDR 17 then provides an output indicative of such points, which are likely sources of anomalies. In other embodiments, other types of OTDRs may be used. Exemplary embodiments of OTDRs are described in commonly-assigned U.S. patent application Ser. No. 12/783,999, entitled "Systems and Methods for Unobtrusively Testing Optical Fibers" and filed on May 20, 2010, which is incorporated herein by reference.

Figure 2:
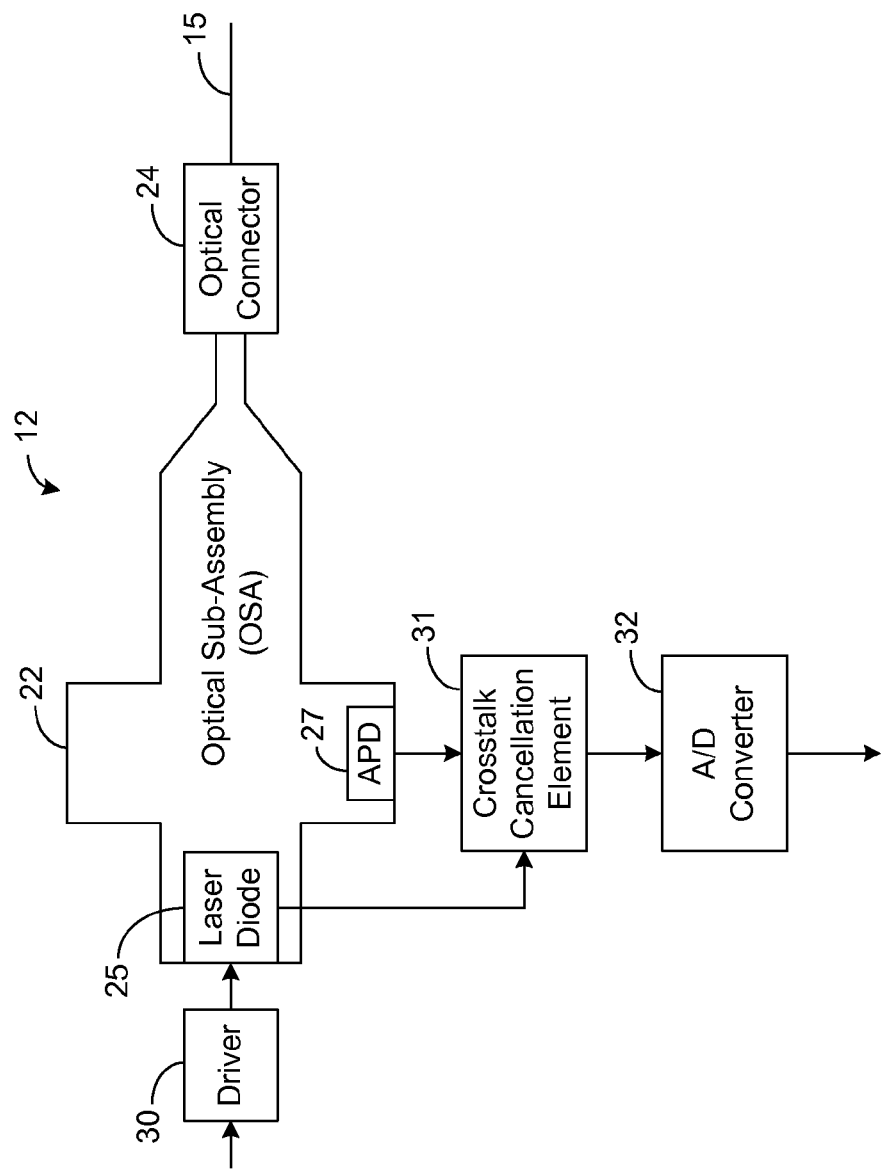
FIG. 2 is a block diagram illustrating an exemplary embodiment of an optical transceiver, such as is depicted by FIG. 1.

FIG. 2 depicts an exemplary embodiment of an optical transceiver 12, such as is depicted by FIG. 1. The exemplary optical transceiver 12 of FIG. 2 comprises an optical subassembly (OSA) 22 coupled to an optical fiber 15 through an optical connector 24. The OSA 22 comprises an optical emitter and an optical detector residing within a housing 23. As an example, in the embodiment shown by FIG. 2, the housing 23 houses a laser diode 25 for transmitting optical signals through the fiber 15 and an avalanche photodiode (APD) 27 for receiving optical signals (e.g., returns of the signal transmitted by the laser diode 25). However, other types of optical emitters and optical detectors are possible in other embodiments.

The laser diode 25 is coupled to a driver 30 that receives an electrical signal and drives the laser diode 25 based on such data signal with the appropriate voltage and current for the type of laser diode 25 used. The laser diode 25 is configured to convert the electrical signal received from the driver 30 into an optical signal for transmission through the fiber 15. Light from such optical signal is reflected at points along the fiber 15 as the signal propagates, thereby creating optical returns that are received by the APD 27. The APD 27 is configured to receive such optical returns from the fiber 15 and to convert the optical returns into an electrical analog signal.

As shown by FIG. 2, the optical transceiver 12 further comprises a crosstalk cancellation element 31 and an analog-to-digital (A/D) converter 32 coupled to the APD 27. The crosstalk cancellation element 31 receives the analog signal provided by the APD 27 and combines the analog signal with a crosstalk cancellation signal to cancel optical and/or electrical crosstalk from the analog signal, as will be described in more detail hereafter. The A/D converter 32 receives the analog signal from the crosstalk cancellation element 31 and converts such signal to a digital signal. Each digital sample output by the A/D converter 32 represents a measurement of light (e.g., an optical return) detected by the APD 27. Each such digital sample is transmitted to the OTDR 17, which is configured to detect anomalies along the fiber 15 based on the digital measurements provided by the A/D converter 32.

Note that portions of the optical signal transmitted by the laser diode 25 reflect from an inner wall of the housing 23 and are received by the APD 27. The remainder of the transmitted optical signal mostly enters and propagates through the fiber 15. The light received by the APD 27 before entering the fiber 15 has relatively high amplitudes at the APD 27 since it is not attenuated by the fiber 15. Thus, the reflections from the OSA 22 significantly increase the amplitude of the analog signal output by the APD 27 and, if the contributions of such OSA reflections are not removed from the analog signal, usurp a significant portion of the A/D converter's dynamic range. In one exemplary embodiment, the crosstalk cancellation element 31 is configured to cancel the OSA reflections from the analog signal thereby preserving more of the dynamic range of the A/D converter 32 for the fiber reflections.

In addition, the electrical driver circuitry (e.g., driver 30 and associated wiring) for driving the laser diode 25 is in close proximity to the electrical receive circuitry (e.g., APD 27, A/D converter 32, and associated wiring) for receiving and measuring optical signals such that electromagnetic energy couples from the driver circuitry to the receive circuitry. Such energy interferes with the analog signal output by the APD 27 and is generally referred to as "electrical crosstalk." As set forth above, such electrical crosstalk is particularly problematic for optical returns used by the OTDR 17 for detecting line anomalies due to the relatively small amplitudes of such returns. In one exemplary embodiment, the crosstalk cancellation element 31 is configured to cancel electrical crosstalk from the analog signal thereby improving the OTDR measurements.

In one exemplary embodiment, the crosstalk cancellation element 31 functions as an echo canceller by providing a cancellation signal that represents an estimate of the OSA reflections. Thus, by subtracting the cancellation signal from the analog signal provided by the APD 27, contributions of the OSA reflections are removed from the analog signal, thereby decreasing the peak amplitude of such signal. In addition to or in lieu of cancelling optical crosstalk, the crosstalk cancellation element 31 may also be configured to cancel electrical crosstalk, as will be described in more detail below.

Figure 3:
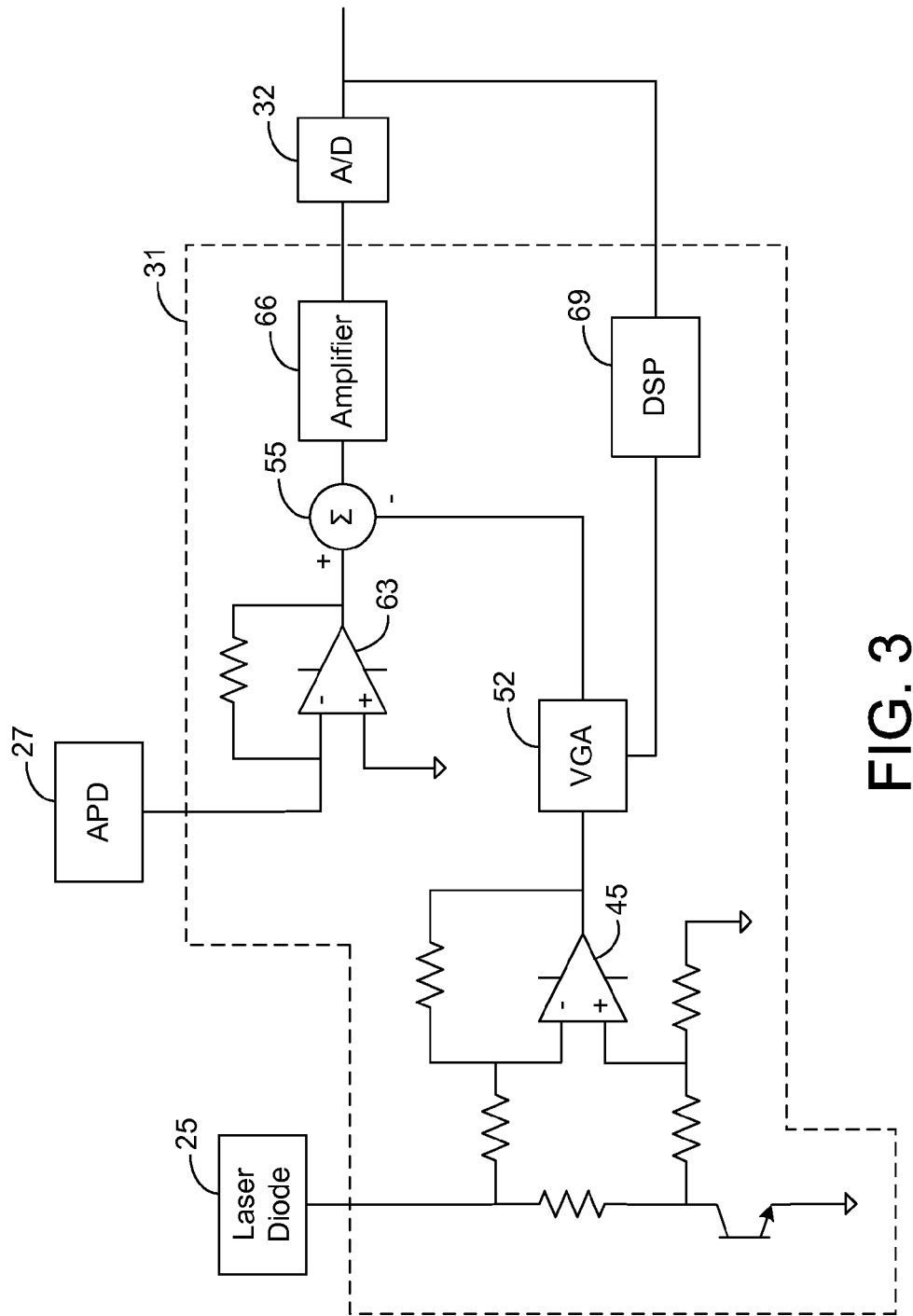
FIG. 3 is a block diagram illustrating an exemplary embodiment of a crosstalk cancellation element, such as is depicted by FIG. 2.

FIG. 3 depicts an exemplary embodiment of the crosstalk cancellation element 31. As shown by FIG. 3, the crosstalk cancellation element 31 has a differential amplifier 45 that is coupled to the laser diode 25 and receives the current that passes through and drives the laser diode 25. Thus, the output of the differential amplifier 45 has a voltage that is proportional to the current driving the laser diode 25.

The differential amplifier 45 is coupled to a variable gain amplifier 52 that is configured to amplify the output of the differential amplifier 45 to provide a cancellation signal that is transmitted to a signal combiner 55 (e.g., a summer). The signal combiner 55 is coupled to an output of a transimpedance amplifier 63, which is coupled to the APD 27 and provides an analog signal indicative of the light detected by the APD 27. Note that since the OSA returns reflect from a very short distance from the laser diode 25 (e.g., a few centimeters), the signal output from the amplifier 45 should be substantially synchronized with the output of the amplifier 63. Thus, matching the frequency response of the amplifier 45 with that of the amplifier 63 does not require complex synchronization or equalization circuitry.

The signal combiner 55 is configured to subtract the cancellation signal from the analog signal output by the amplifier 63 in order to cancel the OSA reflections from the analog signal. Thus, the analog signal output by the signal combiner 55 is substantially free of contributions from OSA reflections, and such analog signal is amplified by an amplifier 66 before being received by the A/D converter. 32.

The gain applied by the VGA 52 in the cancellation signal path is controlled based on feedback from the output of the amplifier 66 in order to minimize the power output by the amplifier 66. In this regard, a feedback path from the output of the A/D converter 32 comprises a digital signal processor (DSP) 69 that is configured to receive and process the digital signal output by the A/D converter 32 in order to provide a control signal for controlling the gain of the VGA 52. In particular, the DSP 69 is configured to adjust the gain of the VGA 52 in order to minimize the digital measurements received by the DSP 69. In one exemplary embodiment, the gain control algorithm is implemented via software running on the DSP 69. However, in other embodiments, other types of circuitry may be used to implement the functionality of the DSP 69. As an example, circuitry for performing the functionality of the DSP 69 may be implemented in hardware without the use of any software or firmware. As will be described in more detail hereafter, the cancellation signal path may also have one or more filters (not shown in FIG. 3) in order to further adjust the cancellation signal in order to cancel both optical and electrical crosstalk from the analog signal.

Figure 4:
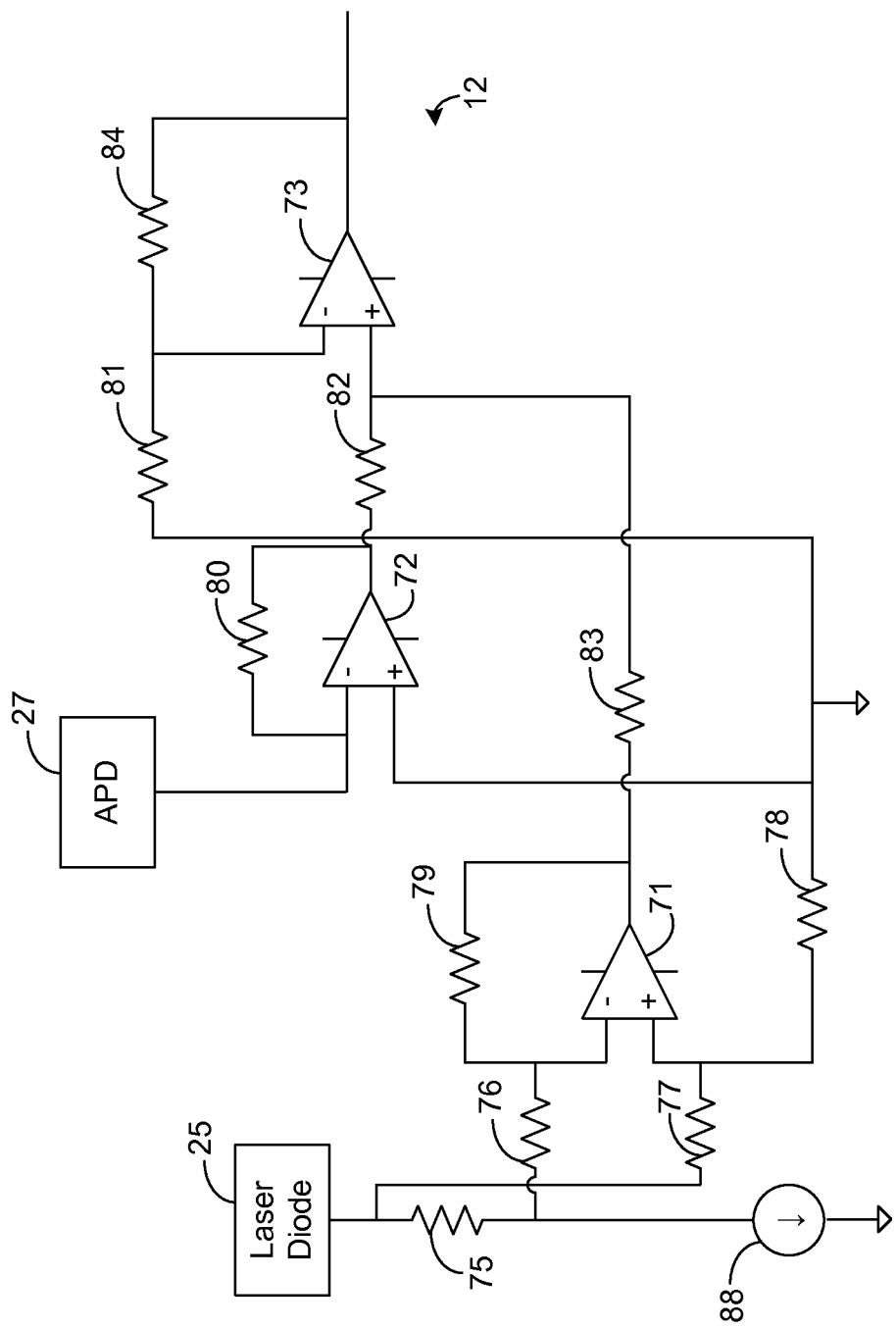
FIG. 4 is a circuit diagram illustrating an exemplary circuit for an optical transceiver, such as is depicted by FIG. 2.

FIG. 4 depicts an exemplary circuit diagram for the transceiver 12, including the crosstalk cancellation element 31. As shown by FIG. 4, the exemplary circuit comprises operational amplifiers 71-73, a plurality of resistors 75-84, and at least one current source 88. The resistance of resistor 83 is variable to compensate for variations, such as temperature fluctuations and unit-to-unit variations in optical subassemblies. The amplifier 71 measures a voltage drop across resistor 75, and the circuit is designed such that the frequency response of the amplifier 71 matches the frequency response of the amplifier 72. Thus, optical crosstalk in the analog signal from the APD 27 is cancelled at the input of the amplifier 73.

Figure 5:
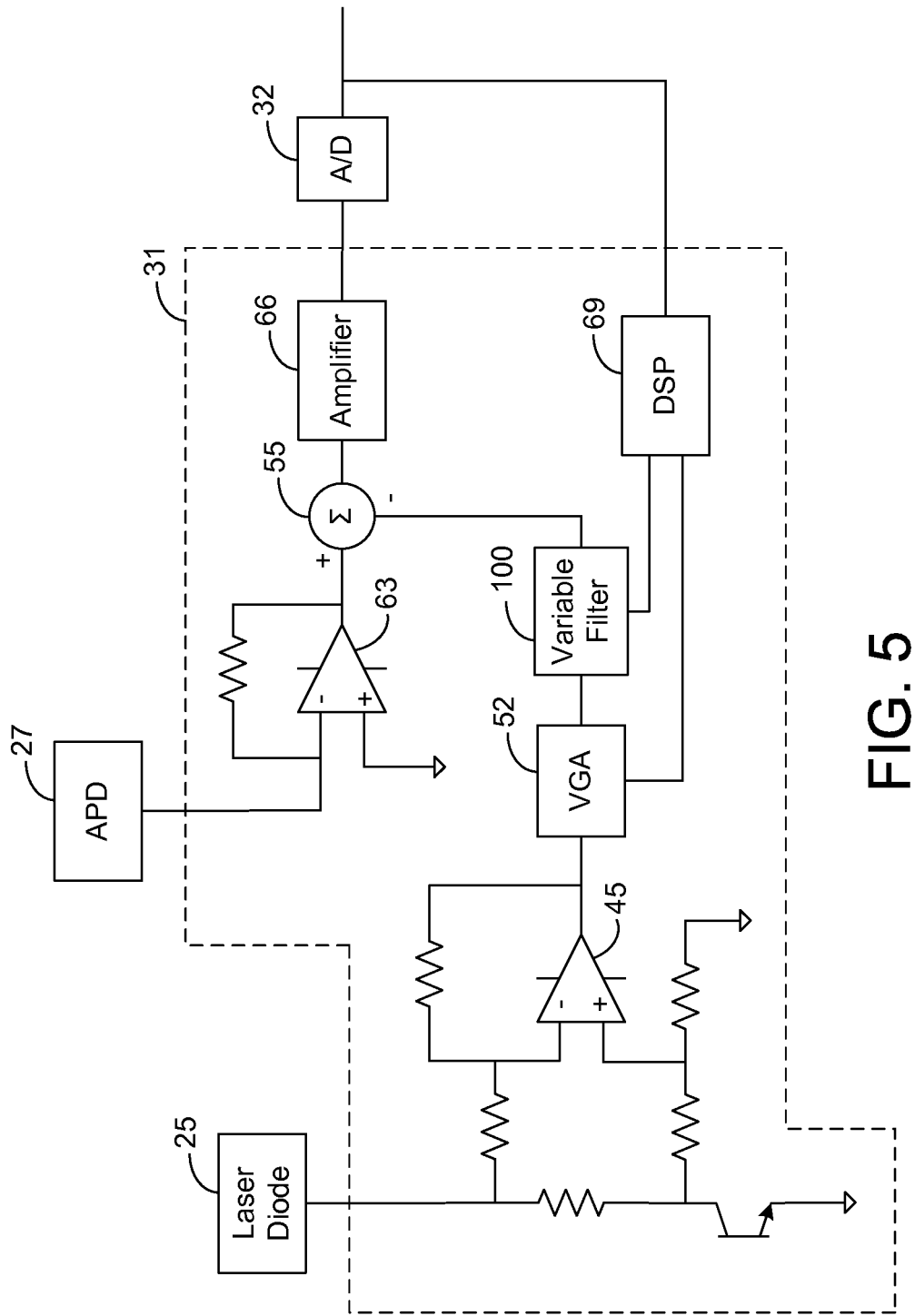
FIG. 5 is a block diagram illustrating an exemplary embodiment of a crosstalk cancellation element, such as is depicted by FIG. 2.

FIG. 5 depicts another exemplary embodiment of the crosstalk cancellation element 31. Except as otherwise described herein, the circuit of FIG. 5 is configured and operates the same as the circuit shown by FIG. 3. As shown by FIG. 5, the crosstalk cancellation element 31 has a filter 100 within the path of the cancellation signal. The filter 100 is configured to adjust the cancellation signal so that it cancels both optical and electrical crosstalk from the analog signal with which it is combined by the signal combiner 55. In one exemplary embodiment, the filter 100 is implemented as a variable filter having sets of coefficients that are adaptively updated by the DSP 69 based on feedback from the output of amplifier 66 in order to match the frequency response of the amplifier 45 with the frequency response of the amplifier 63 across a wide range of frequencies. Accordingly, the filter 100 adjusts the cancellation signal such that it models the electrical crosstalk affecting the analog signal. Therefore, subtraction of the cancellation signal from the analog signal by the signal combiner 55 not only cancels optical crosstalk but also cancels electrical crosstalk as well.

Figure 6:
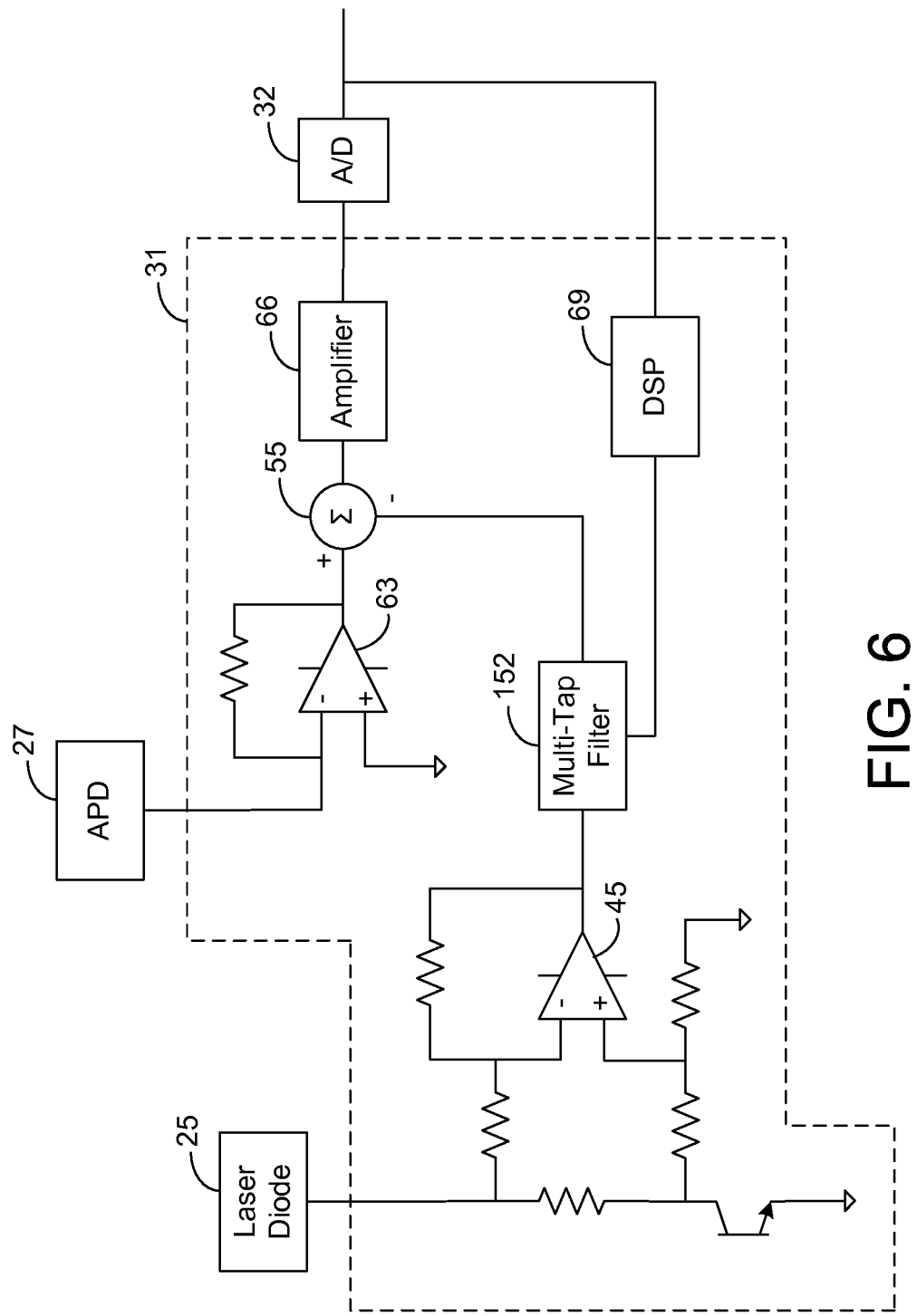
FIG. 6 is a block diagram illustrating an exemplary embodiment of a crosstalk cancellation element, such as is depicted by FIG. 2.

FIG. 6 depicts yet another exemplary embodiment of the crosstalk cancellation element 31 in which a multi-tap filter 152 is used in lieu of the VGA 52 and filter 100 of FIG. 5. The filter 152 has multiple taps corresponding respectively to multiple delays, similar to echo cancellers that are conventionally used to remove echoes from conventional twisted-wire pairs. Such taps are updated by the DSP 69 based on feedback from the output of the amplifier 66 so that the optical and electrical crosstalk is minimized.

One, or perhaps a small number, of the taps of the filter 152 corresponds to optical crosstalk generated within the OSA 22 and is used to cancel the OSA reflections. The delay associated with such tap(s) is extremely short given that the distance from the laser diode 25 to the point of reflection for the OSA reflections is on the order of just a few centimeters. The taps also adjust the cancellation signal to model differences in the frequency response of the receive paths as well as the electrical crosstalk affecting the analog signal. Thus, both optical and electrical crosstalk are cancelled by the crosstalk cancellation element 31 of FIG. 6.

An exemplary use and operation of the optical transceiver 12 will be described in more detail hereafter with particular reference to FIG. 7.

Figure 7:
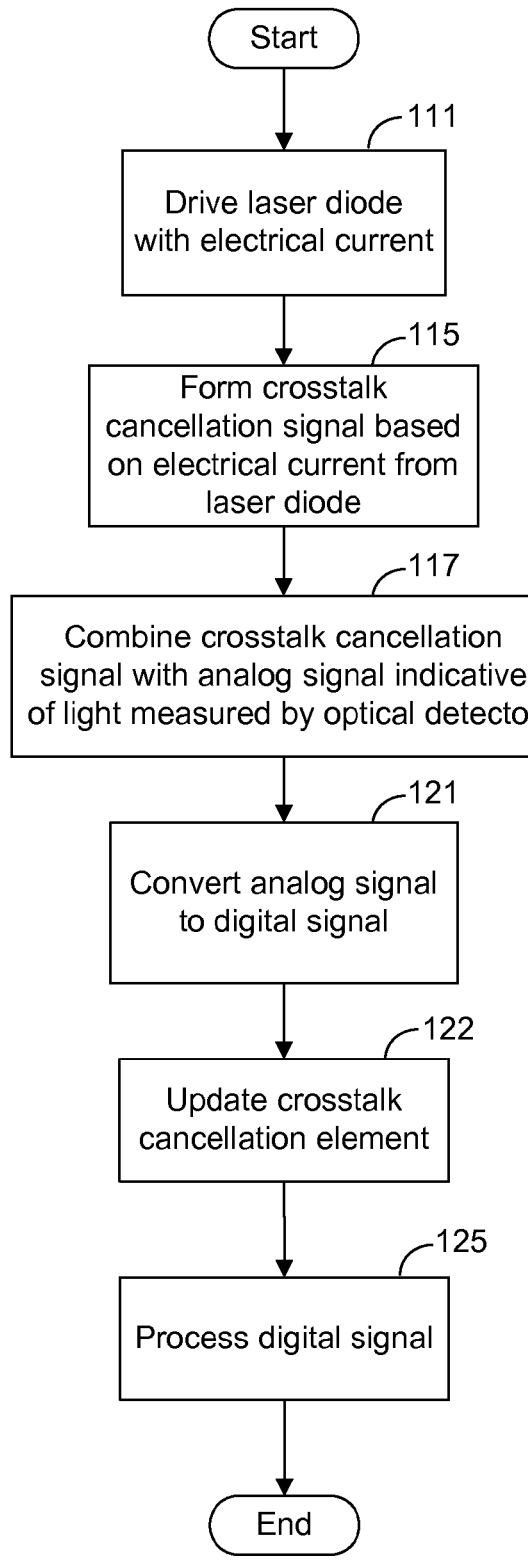
FIG. 7 is a flow chart illustrating an exemplary method for operating an optical transceiver, such as is depicted by FIG. 2.

Initially, the driver 30 drives the laser diode 25 with electrical current thereby causing the laser diode 25 to emit optical signals that propagate through the optical fiber 15, as shown by block 111 of FIG. 7. Such electrical current passes through the laser diode 25 and is received by the crosstalk cancellation element 31, which forms a crosstalk cancellation signal based on the electrical current, as shown by block 115 of FIG. 7.

Some of the light emitted by the laser diode 25, referred to herein as "OSA returns" or "OSA reflections," is reflected by the OSA 22 and is detected by the APD 27. In addition, some of the light emitted by the laser diode 25 enters and propagates through the optical fiber 15. At points along the fiber 15, portions of the light, referred to herein as "fiber returns" or "fiber reflections," propagating through the fiber 15 reflect back toward the optical transceiver 12 and are detected by the APD 27. Such fiber returns, unlike the OSA returns, are indicative of anomalies along the fiber 15 and, hence, are of interest to the OTDR 17.

The APD 27 measures the light received by it and provides an analog signal indicative of such light. The crosstalk cancellation signal formed by the crosstalk cancellation element 31 represents an estimate of the contributions of the OSA reflections in the analog signal as well as electrical crosstalk from the driver circuitry (e.g., driver 30, laser diode 25, and associated wiring). The crosstalk cancellation element 31 subtracts the cancellation signal from the analog signal thereby cancelling the contributions of the OSA reflections and the electrical crosstalk induced by the driver circuitry, as shown by block 117 of FIG. 7.

The analog signal, which is now substantially free of electrical and optical crosstalk, is converted to a digital signal by the A/D converter 32, as shown by block 121, and the digital signal is used to update the crosstalk cancellation element, as shown by block 122 of FIG. 7. Further, such digital signal is processed as may be desired, as shown by block 125. As an example, in the embodiment depicted by FIG. 1, the digital signal is processed by the OTDR 17 in order to detect anomalies along the fiber 15. In other embodiments, the digital signal may be processed for other reasons by other types of circuitry.

The invention claimed is:

1. An optical communication system, comprising:
   an optical subassembly (OSA) having an optical emitter and an optical detector, the optical emitter coupled to an optical fiber;
   a driver configured to drive the optical emitter with electrical current thereby causing the optical emitter to emit light, wherein the optical detector is configured to detect the light and provide an analog signal indicative of the light detected by the optical detector, including OSA returns and returns from the optical fiber; and
   a crosstalk cancellation element configured to receive the electrical current from the optical emitter and to provide, based on the electrical current, a cancellation signal for cancelling crosstalk in the analog signal, the crosstalk cancellation element further configured to combine the cancellation signal with the analog signal thereby cancelling the crosstalk from the analog signal.

2. The system of claim 1, wherein the crosstalk cancelled by the crosstalk cancellation element comprises contributions from the OSA returns.

3. The system of claim 1, wherein the crosstalk cancelled by the crosstalk cancellation element comprises electrical crosstalk induced by the driver.

4. The system of claim 3, wherein the crosstalk cancelled by the crosstalk cancellation element comprises contributions from the OSA returns.

5. The system of claim 1, wherein the crosstalk cancellation element comprises a multi-tap filter for forming the cancellation signal based on the electrical current.

6. The system of claim 1, wherein the crosstalk cancellation element comprises a variable gain amplifier for forming the cancellation signal based on the electrical current.

7. The system of claim 6, wherein the crosstalk cancellation element comprises a variable filter coupled to the variable gain amplifier.

8. The system of claim 1, further comprising:
- an analog-to-digital converter configured to receive the analog signal and to convert the analog signal into a digital signal, wherein samples of the digital signal indicate the returns from the optical fiber; and
- an optical time domain reflectometer configured to detect anomalies along the optical fiber based on the samples.

9. A method, comprising:
- driving an optical emitter of an optical subassembly (OSA) with electrical current thereby causing the optical emitter to emit light;
- detecting the light via an optical detector of the OSA, wherein the light detected via the optical detector includes OSA returns and returns from an optical fiber coupled to the optical emitter;
- providing an analog signal indicative of the light detected via the optical detector;
- receiving the electrical current from the optical emitter;
- providing a cancellation signal based on the electrical current; and
- cancelling crosstalk in the analog signal, the cancelling comprising combining the cancellation signal with the analog signal.

10. The method of claim 9, wherein the cancelling comprises cancelling from the analog signal contributions of the OSA reflections.

11. The method of claim 9, wherein the cancelling comprises cancelling from the analog signal electrical crosstalk induced by the driving.

12. The method of claim 11, wherein the cancelling comprises cancelling from the analog signal contributions of the OSA reflections.

* * * * *